United States Patent Office 3,796,800
Patented Mar. 12, 1974

3,796,800
ANTI-INFLAMMATORY TRIAZOLE COMPOSI-
TIONS AND METHODS FOR USING SAME
Zaven S. Ariyan, Woodbury, Conn., and Marshall Kulka
and William A. Harrison, Guelph, Ontario, Canada,
assignors to Uniroyal, Inc., Middlebury, Conn., and
Uniroyal Ltd., Montreal, Quebec, Canada
No Drawing. Filed Nov. 22, 1971, Ser. No. 201,143
Int. Cl. A61k 27/00
U.S. Cl. 424—270
28 Claims

ABSTRACT OF THE DISCLOSURE

A broad class of thiazole derivatives, including certain 2-aminothiazoles and 2-(N-morpholido)-thiazoles, are useful as anti-inflammatory agents.

CROSS REFERENCE TO RELATED APPLICATIONS

This application is related to, and incorporates by reference, U.S. Pat. 3,547,917 to Kulka et al. disclosing methods for preparing many of the thiazole derivatives of the present invention.

This application is also related to U.S. Pat. 3,505,055 to von Schmeling et al. disclosing the fungicidal and plant growth regulating activity of many of the thiazole derivatives of the present invention.

BACKGROUND OF THE INVENTION

Field of the invention

The invention relates to thiazole derivatives which are useful as antiinflammatory agents, i.e., they prevent and/or inhibit the formation of granuloma tissue in animals. Accordingly, the invention is, in one aspect thereof, a method of preventing and/or inhibiting the formation of granuloma tissue in animal subjects. In a second aspect, the invention is a class of pharmaceutical compositions containing the present thiazole derivatives.

Description of the prior art

Thiazole derivatives, including numerous 2-aminothiazol are known. However, none of the known 2-aminothiazol compounds has ever been disclosed as having anti-inflammatory properties.

British Pat. 1,099,389 describes certain 2,4-disubstituted thiazoles (which are structurally dissimilar to the compounds of the present invention), e.g.,

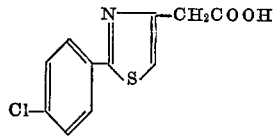

as having antiinflammatory activity. This compound contains an acidic function, and the acidic function has been postulated as being responsible for the reactivation of latent ulcers. Thus, acidic moieties are considered to be "ulcerogenic." The compounds of the present invention, as will become apparent, are nonacidic compounds, and thus do not suffer from the drawbacks of the known compounds.

The patent to Kulka et al. (3,547,917) noted above discloses a broad class of aminothiazoles and methods for preparing same.

According to the Kulka et al. patent, aminothiazoles are prepared by well known methods of thiazole synthesis. Thus, as described in Kulka et al., a thioamide of the formula:

is reacted with an α-halocarbonyl compound of the formula:

$$\begin{array}{c} O=C-B \\ | \\ Hal-CH-D \end{array}$$

in the presence of a solvent such as water or alcohol with heating, followed by basification to form a compound of the formula:

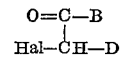

wherein A is an amino or substituted amino group, B is an alkyl group, D is a carbamoyl or a mono- or di-substituted carbamoyl group and Hal is a halogen.

Alternatively, the thioamide may be reacted with $SO_2Cl_2$ and a nonhalogenated precursor of the α-halocarbonyl compound, namely, $$\begin{array}{c} O=C-B \\ | \\ CH_2-D \end{array}$$

in benzene or toluene to form the hydrochloride of the 2-aminothiazole, after which the free base is recovered therefrom.

The von Schmeling et al. patent, noted above discloses and claims methods of using the said Kulka et al. compounds for agricultural purposes.

SUMMARY OF THE INVENTION

The invention provides a safe and effective method of preventing and inhibiting the formation of granuloma tissue in an animal subject. This is achieved by administering to an animal subject a therapeutically effective amount of at least one compound selected from a very large group of thiazole derivatives, including 2-aminothiazoles and 2-(N-morpholino)-thiazoles. Generally, the amount administered will be from about 0.1 to 100 mg./kg./day of body weight, preferably from about 10 to 25 mg./kg./day. In humans, the amount will be from about 0.1 to 1 mg./kg./day, preferably from about 0.25 to 0.6 mg./kg./day.

The invention further provides a new class of pharmaceutical compositions comprising said thiazole derivatives which are effective as antiinflammatory agents.

The 2-aminothiazoles which are among those used in the present methods are those having the formula:

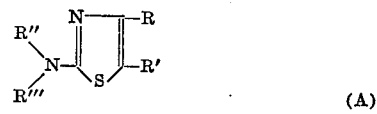

(A)

wherein R is lower alkyl (e.g., —$CH_3$), or N-aminocarbamoyl; R'' and R''' are independently selected from the group consisting of hydrogen, lower alkyl (e.g., —$C_2H_5$) and lower acyl (e.g., —$COCH_3$); and R' is hydrogen, $CONHR_1$ or $CONR_2R_3$, wherein $R_1$ is phenyl, mono-, di- or tri- (lower)-alkylphenyl (e.g., o-tolyl, o-ethylphenyl, 2,6-di-methyl [and ethyl] phenyl and 2,4,6-trimethylphenyl), benzyl, halophenyl (e.g., o-chlorophenyl), cyclohexyl or amino; $R_2$ is lower alkyl ($C_1$–$C_3$); $R_3$ is lower alkyl ($C_2$–$C_3$) or phenyl; or $R_2$ and $R_3$ together with the nitrogen atom form a morpholino ring, and pharmaceutically acceptable acid addition salts thereof such such as the hydrochloride.

The 2-(N-morpholino)thiazole derivatives which are among those used in the present methods are those having the formula:

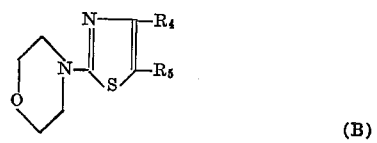

(B)

wherein $R_4$ is a lower alkyl group (e.g., methyl or ethyl) and $R_5$ is —H, —$CONHC_6H_5$ or —$CONHC_6H_3$ (2,6-diethyl); and pharmaceutically acceptable acid addition salts thereof such as the hydrochloride.

The pharmaceutical compositions according to the invention comprise, in combination, a therapeutically effective amount of at least one of the above-described thiazole derivatives and a pharmaceutically acceptable carrier and/or diluent therefor.

For example, in the case of a tablet, the composition will comprise, in addition to the active ingredients, fillers, binders and diluents such as lactose, methylcellulose, talc, gum tragacanth, gum acacia, agar, polyvinylpyrrolidone, stearic acid, and/or corn starch, etc. In the case of a liquid suspension for oral administration, the composition will comprise, in addition to the active ingredients, a filler such as sodium carboxymethylcellulose and/or syrup, e.g., a glycerine based syrup. In the case of a parenteral solution or suspension, the composition will comprise, in addition to the active ingredient, a suitable solvent or other liquid such as a saline solution. In the case of a topical ointment, the composition will comprise, in addition to the active ingredient, a vehicle such as petroleum jelly or hydrophilic petrolatum.

The most preferred compound from among all those of the Formula A is 2 - amino-2',4,4',6'-tetramethyl-5-thiazolecarboxanilide, i.e., the compound wherein R is methyl, R'' and R''' are hydrogen, and R' is $CONHR_1$ in which $R_1$ is 2,4,6-trimethylphenyl. This compound in the rat (at a dose of 200 mg./kg.) produces a reduction of 77% in carrageenin induced edema.

The most preferred compound from among all those of the Formula B is 2-(N-morpholino)-4-methyl-5-thiazolecarboxanilide, i.e., the compound wherein $R_4$ is methyl and $R_5$ is —$CONHC_6H_5$. The compound in the rat (at a dose of 200 mg./Hg.) produces a reduction of 52% in carrageenin induced edema.

DETAILED DESCRIPTION

The 2-aminothiazoles of the present invention can be prepared by the methods disclosed in the Kulka et al patent.

One method is the reaction sequence which comprises reacting an α-halocarbonyl compound of the formula:

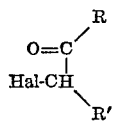

and a thioamide of the formula:

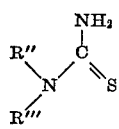

wherein R, R', R'' and R''' are as defined above and Hal is a halogen, to form the hydrohalide salt of the 2-aminothiazole derivative of the Formula A:

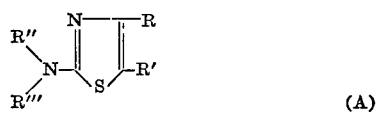

(A)

The free base is obtained from the hydrohalide salt by basification with an alkali such as ammonium hydroxide, an alkali metal hydroxide, $NaHCO_3$, etc.

The actual preparation of the 2-aminothiazole derivatives consists of mixing the α-halocarbonyl compound with the thioamide (excess thioamide may be used) in the presence of a suitable solvent such as water or alcohol and heating the mixture on the steam bath for a short time (15 minutes to 2 hours) followed by basification. The precipitated aminothiazole is filtered off, washed with water and with benzene. The aminothiazoles are insoluble in benzene and this enables their preparation from crude α-halocarbonyl compound because the impurities present in such a crude starting material are usually benzene-soluble and may be washed out of the end product.

Alternatively the reaction may be carried out in one step by mixing together the thioamide, the unhalogenated precursor of the α-halocarbonyl compound, i.e.,

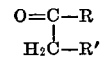

and sulfuryl chloride in benzene or toluene, heating for a short time and then recovering the 2-aminothiazole from its hydrohalide.

The "2-(N morpholido) thiazoles" of the present invention can be prepared by the same methods as are used to prepare the 2-aminothiazoles, except that a thioamide of the formula:

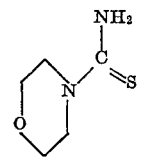

is reacted with an α-halocarbonyl compound of the formula:

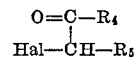

to form the hydrohalide salt of the 2-(N-morpholido) thiazole of the Formula B:

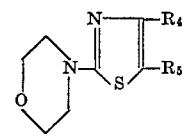

(B)

wherein $R_4$, $R_5$ and Hal are as defined above.

As previously stated, the Kulka et al. patent discloses and exemplifies the preparation of many of the compounds of the present invention using the above-described methods. For the sake of convenience and completeness however, there follow working examples showing the preparation of some of the present compounds using the said methods. It will be understood, of course, that the methods are also applicable to all the compounds of the present invention.

EXAMPLE 1

2-amino-4-methyl-5-thiazolecarboxanilide

Method A.—846 g. of α-chloroacetoacetanilide (4 moles), 310 g. of thiourea and 1400 ml. of ethanol were mixed thoroughly at room temperature. An exothermic reaction soon started and solution was virtually complete within a few minutes. The reaction flask was then placed on a steam cone and heated for 15–20 minutes. Precipitation of hydrochloride started almost immediately. The reaction mixture was cooled and the hydrochloride collected by filtration. The hydrochloride was dissolved in warm water and the solution filtered and basified with ammonium hydroxide. The precipitated base was filtered off and dried. The crude product (815 g., 87% yield) started to melt at 211° and finally melted with decomposition at 262°. Recrystallization from ethanol gave 692 g. of 2-amino-4-methyl-5-thiazolecarboxanilide which started to melt at 221° or higher. Yield: 74%. (The purified base partially melts at 222–223° and then becomes solid again. Decomposition occurs slowly as the temperature is raised and the final melting point is variable.)

Method B.—A reaction mixture of α-chloroacetoacetanilide (528 g., 2.5 mol), thiourea (190 g., 2.5 mol) and water (1600 ml.) was stirred and heated at 80–90° until the solid dissolved (about one hour). The hot solution was filtered and the filtrate basified with a solution of concentrated ammonium hydroxide (28 to 30%) (203 ml.) and water (300 ml.). The white precipitate was filtered, washed with water and dried. The white product melted at 220–223° and weighed 526 g. or 90%.

EXAMPLE 2

2-amino-2'-chloro-4-methyl-5-triazolecarboxanilide

A solution of sulfuryl chloride (33 g.) in benzene (50 ml.) was added portionwise to a flask containing o-chloroacetoacetanilide (51 g.) and benzene (200 ml.). After the reaction mixture had stood for 2 hours at room temperature the benzene was removed under vacuum. To the residue, which crystallized on cooling, was added ethanol (225 ml.) and thiourea (20 g.). After the strongly exothermic reaction had subsided, the mixture was heated for 10 minutes on a steam cone. A slurry of the crude hydrochloride in water was treated with aqueous ammonia to liberate the base. The base was recrystallized from ethanol, in which it is only slightly soluble to give white crystals (55 g. or 86% yield) which melted at 258–259° with decomposition.

EXAMPLES 3–15

These examples are directed to other 2-aminothiazoles prepared. The preparations of Compounds 1 and 2 are shown in detail in Examples 1–2 which are representative of the methods employed for preparing the compounds set forth in the following Table I:

Table II is directed to other 2-(N-morpholido)thiazoles prepared by this method.

TABLE II (N-morpholido)thiazoles

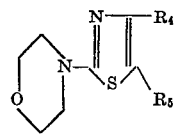

| Ex. | Compound | $R_4$ | $R_5$ | M.P., °C. | Yield, percent |
|---|---|---|---|---|---|
| 16 [1] | 16 | —Et | —H | 159–162 | 84 |
| 17 | 17 | —Me | —CONHPh | 163–165 | 81 |
| 18 [1] | 18 | —Me | —CONHPh | 214–216 | 90 |
| 19 | 19 | —Me | —CONHPh(2,6-di-Et) | 171–172 | 72 |

[1] Hydrochloride.

NOTE.—In Table II, —Me=—CH$_3$; —Et=—C$_2$H$_5$ and —Ph=—C$_6$H$_5$.

The compounds of the present invention have pharmaceutical activity as anti-inflammatory agents, effective in the prevention and inhibition of granuloma tissue formation. The activity is demonstrated by a test which involves the diminution of experimental edema induced in the hind paw of the rat by the injection of carrageenin. This test is

TABLE I.—2-AMINOTHIAZOLES

| Ex. | Compound | R | R' | R'' | R''' | M.P., °C. | Yield, percent |
|---|---|---|---|---|---|---|---|
|  | 1 | —Me | —CONHPh | H | H | ([1]) | 74 |
|  | 2 | —Me | —CONHPh(o-Cl) | H | H | 258–259d | 86 |
| 3 | 3 | —Me | —CONHPh(o-Et) | H | H | 198–200 | 29 |
| 4 | 4 | —Me | —CONHPh(2,4,6-tri-Me) | H | H | 243–246d | 42 |
| 5 | 5 | —Me | 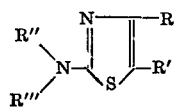 | H | H | 176–178d | 55 |
| 6 | 6 | —Me | —CONHCH$_2$Ph | H | H | 143–145 | 60 |
| 7 | 7 | —Me | —CONHC$_6$H$_{11}$ | H | H | 238–240 | 55 |
| 8 | 8 | —Me | —CON(Et)$_2$ | H | H | 159–162 | 45 |
| 9 | 9 | —Me | —CON(i-Pr)$_2$ | H | H | 236–238 | 43 |
| 10 | 10 | —Me | —CON(morpholino) | H | H | 216–218 | 54 |
| 11 | 11 | —Me | —CONHPh(2,6-di-Et) | H | H | 206–209 | 60 |
| 12 | 12 | —Me | —CONHPh(2,6-di-Me) | H | H | ([2]) | 69 |
| 13 | 13 | —CONHNH$_2$ | —CONHNH$_2$ | —MeCO | H | >300 | 56 |
| 14 | 14 | —Me | —CONH(o-tolyl) | H | —MeCO | 223–226 | 65 |
| 15 | 15 | —Me | —CONHPh | —Et | —Et | 110–112 | 55 |

[1] Double M.P., 222–224 and 270–285 decomp.
[2] Double M.P., 249–251, 275 decomp.

NOTE.—In Table I, —Me=—CH$_3$; —Et=C$_2$H$_5$; —i-Pr=—CH(CH$_3$)$_2$; —Ph=—C$_6$H$_5$.

The following Examples 16–19 are directed to the preparation of "2-(N-morpholido)thiazoles."

EXAMPLE 16

4-(4-ethyl-2-thiazolyl)morpholine hydrochloride 4-morpholinethiocarboxamide (20.0 g., 0.137 mole) and 1-chloro-2-butanone (15.0 g., 0.141 mole) were heated in absolute ethanol (150 ml.) under reflux with stirring for two hours. Evaporation of the solvent under vacuum yielded crude 4-(4-ethyl-2-thiazolyl)morpholine hydrochloride (27 g., 84% yield). After recrystallization from ethyl acetate-absolute ethanol, the product melted at 159–162°. A sample of the hydrochloride was dissolved in water and treated with excess ammonium hydroxide to liberate the base, 4-(4-ethyl-2-thiazolyl)morpholine, which was extracted with chloroform and isolated as a pale amber oil when the solvent was evaporated. The NMR spectra of the hydrochloride and the base were in agreement with the assigned structures.

a standard procedure which is well known in the pharmaceutical art.

The procedure used for measuring the inhibition of carrageenin-induced edema is a modification of the method of Winter, et al., Proc. Soc. Exptl. Biol. Med. 111: 544 (1962). The device used for measurement of the paw volume is an adaptation of the water displacement procedure described by Adamkiewicz, et al., Can. J. Biochem. Physiol. 33: 332 (1955). The present compounds were studied for their effectiveness in preventing the edema caused by the intraplantar injection of 0.05 ml. of a sterile 1.0% solution of carrageenin. The present compounds were administered orally one hour prior to the injection of the carrageenin into the left hind paw of rats. At peak swelling time (3 hours) the volume of edema was calculated by differential paw volumes.

We have found that many of the compounds produced significant inhibition of induced edema in rats at a dose rate of 200 mg./kg.

Table III, below describes and lists compounds of the Formula A which exhibit reduction in edema in the hind paw of the rat.

TABLE III.—PERCENT REDUCTION IN EDEMA AT 200 MG/.KG.

Compounds of Formula A

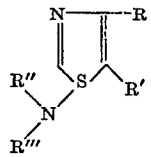

| Compound number | R | R' | R'' | R''' | Percent reduction of induced edema |
|---|---|---|---|---|---|
| 1 | —Me | —CONHPh | H | H | 33 |
| 2 | —Me | —CONHPh(o-Cl) | H | H | 20 |
| 3 | —Me | —CONHPh(o-Et) | H | H | 21 |
| 4 | —Me | —CONHPh(2,4,6-tri-Me) | H | H | 77 |
| 5 | —Me | —CON(Me)(Ph) | H | H | 23 |
| 6 | —Me | —CONHCH$_2$Ph | H | H | 38 |
| 7 | —Me | —CONH-cyclohexyl | H | H | 33 |
| 8 | —Me | —CON(Et)$_2$ | H | H | 60 |
| 9 | —Me | —CON(CH(CH$_3$)$_2$)$_2$ | H | H | 38 |
| 10 | —Me | —CON(morpholino) | H | H | 44 |
| 11 | —Me | —CONHPH(2,6-di-Et) | H | H | 66 |
| 12 | —Me | —CONHPH(2,6-di-Me) | H | H | 64 |
| 13 | —CONHNH$_2$ | —CONHNH$_2$ | —MeCO | H | 34 |
| 14 | —Me | —CONH(o-tolyl) | H | —CH$_3$CO | 41 |
| 15 | —Me | —CONHPh | —Et | —Et | 29 |

NOTE.—In Table III, —Me=—CH$_3$; —Et=—C$_2$H$_5$; and —Ph=—C$_6$H$_5$.

Table IV, below, describes and lists compounds of the Formula B which exhibit reduction in edema in the hind paw of the rat.

TABLE IV.—PERCENT REDUCTION IN EDEMA AT 200 MG./KG.

Compounds of Formula B

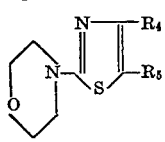

| Compound number | R$_4$ | R$_5$ | Percent reduction edema at 200 mg./kg. |
|---|---|---|---|
| 16 [1] | —Et | —H | 58 |
| 17 | —Me | —CONHPh | 52 |
| 18 [1] | —Me | —CONHPh | 15 |
| 19 | —Me | —CONHPh(2,6-di-Et) | 20 |

[1] Hydrochloride.

NOTE.—In Table IV, —Me=CH$_3$; —Et=—C$_2$H$_5$; and —Ph=—C$_6$H$_5$.

As can be readily seen from the foregoing Tables III and IV, all of the compounds of the present invention are effective in reducing induced edema by at least 20% in the rat at a dose of 200 mg./kg., except for Compound 18 which is the hydrochloride of Compound 17.

The compounds numbered 4, 6, 9, 11, 13 and 17 (see Tables III and IV) were selected for further study to determine the ED$_{50}$ in edema reduction. In this test, a group of normal rats was injected with carrageenin to induce edema. Then the rats were treated with varying amounts of the above-described six compounds, and the ED$_{50}$ was determined.

The procedure used for measuring the inhibition of carrageenin-induced edema is the above-described modification of the method of Winter et al., Proc. Soc. Exptl. Biol. Med. 111: 544 (1962). The device used for measurement of the paw volume is an adaptation of the water displacement procedure described by Adamkiewsicz et al., Can. J. Biochem. Physiol. 33: 332 (1955). The above compounds were studied for their effectiveness in preventing the edema caused by the intraplantar injection of 0.05 ml. of a sterile 1.0% solution of carrageenin. Compounds were administered orally one hour prior to the injection of the carrageenin into the left hind paw of rats. At peak swelling time (3 hours) the volume of edema was calculated by differential paw volumes. The ED$_{50}$ value was obtained for each compound and is defined as that dose which reduced edema formation by 25% or more compared with the mean control response (parallel run) in 50% of the animals.

The results of this test is given in Table V.

TABLE V.—ED$_{50}$ VS. CARRAGEENIN ASSAY

| Compound number | Dose (mg./kg.) | ED$_{50}$, mg./kg. | Confidence limits |
|---|---|---|---|
| 4 | 10, 30, 100, 300 | 23 | 13–43 |
| 6 | 10, 30, 100, 300 | 43 | 20–92 |
| 9 | 10, 30, 100, 300 | 37 | 15–93 |
| 11 | 10, 30, 100, 300 | 39 | 18–86 |
| 13 | 10, 30, 100, 300 | 44 | 21–92 |
| 17 | 10, 30, 100, 300 | 18 | 12–30 |

Of these six compounds, it will be seen that Compounds 4 and 17 are most effective, that is, they have the lowest ED$_{50}$.

Compounds 4, 6, 9, 11 and 17 were then studied to determine the ED$_{50}$ in adrenalectomized rats using the same range of doses as in the previous test.

The method used was identical to that described above, except that the animals used were adrenalectomized several days prior to assay. Since the results in the non-adrenalectomized animals were similar to those obtained in the adrenalectomized animals, it can be inferred that the antiinflammatory activity of the test compounds was not caused by the release of endogenous andrenocortical steroids.

The results of this test are summarized in Table VI:

TABLE VI.—$ED_{50}$ VS. CARRAGEENIN ASSAY IN ADRENALECTOMIZED RATS

| Compound number | Dose (mg./kg.) | $ED_{50}$, mg./kg. | Confidence limits |
|---|---|---|---|
| 4 | 10, 30, 100, 300 | 27 | 13–57 |
| 6 | 10, 30, 100, 300 | 50 | 23–115 |
| 9 | 10, 30, 100, 300 | 43 | 20–90 |
| 11 | 10, 30, 100, 300 | 78 | 34–179 |
| 17 | 10, 30, 100, 300 | >50 | |

From Tables V and VI, it can be seen that Compound 4 has a lower $ED_{50}$ than Compounds 6, 9, 11 and 17 in adrenalectomized rats as well as in normal rats.

The $LD_{50}$ of each of Compounds 4, 6, 9, 11 and 17 was determined and from the value of each, the therapeutic index was calculated. The therapeutic index is defined as the $LD_{50}$ divided by the $ED_{50}$ in the carrageenin assay. The results are given below in Table VII:

TABLE VII.—THERAPEUTIC INDEX

| | $LD_{50}$ (mg./kg.), 48 hrs. and 5 days | $ED_{50}$ (mg./kg.) | Therapeutic index |
|---|---|---|---|
| Compound number: | | | |
| 4 | >800 | 27 | >35 |
| 6 | >800 | 50 | >18 |
| 9 | >400 | 43 | >11 |
| 11 | >800 | 78 | >18 |
| 17 | >800 | 18 | >40 |

Table VIII gives the results of the test on Compounds 4, 6, 9, 11 and 17 using varying doses to determine the $ED_{50}$ in local vs. systemic edema.

In the development of antiinflammatory agents it is important to distinguish between irritants, which often demonstrate antiinflammatory activity by a counter irritant type of effect versus true antiinflammatory agents. The method selected for demonstrating the true local antiinflammatory effect of the present compounds was that developed by Shanahan, R. W., Arch. Int. Pharmacodyn., 175: 186, 1969. This method utilizes the carrageenin-induced paw edema and the drug is injected locally simultaneously with the irritant substance, carrageenin, into the plantar surface of the hind paw of rats. Male rats weighing between 100 and 170 grams, fasted for 18 hours prior to use were employed in this study. The test compounds were added directly to the 1% carrageenin solution and injected in a volume of 0.5 ml. into the plantar tissue of the left hind paw. A group of control animals received carrageenin only. Three hours later the edema was measured. Antiinflammatory or irritant effect was calculated as the percent increase or decrease in edema between the control groups and the treated groups. Ten rats were used per group. The calculated $ED_{50}$ was based on the number of animals in each group which showed an incerase or decrease of at least 25% change from the mean control values.

TABLE VIII.—LOCAL VS. SYSTEMIC EDEMA
[$ED_{50}$ vs. carrageenin]

| Compound number: | Dose (mg./paw) | $ED_{50}$ (confidence limits) |
|---|---|---|
| 4 | 1, 2, 4, 8 | 1.55 mg./paw (0.7–3.41). |
| 6 | 1, 2, 4, 8 | 3.25 mg./paw (2.0–5.2). |
| 9 | 1, 2, 4, 8 | >1 mg./paw. |
| 11 | 1, 2, 4, 8 | 1.4 mg./paw (0.77–2.52). |
| 17 | 1, 2, 4, 8 | 2 mg./paw (1.5–2.8). |

In the cotton pellet granuloma test, Compounds 4 and 17 each had an $ED_{50}$ of <3 mg./kg.

In this test, the inhibition of granuloma formation was determined by a modification of the method of Meier, et al., Experientia 6: 469 (1950). Essentially, the test consists of subcutaneously implanting a sterile cotton disc into rats with the concomitant oral administration of the test compounds twice daily for four days. Removal of the pellets along with the granuloma formulation after five days was performed and the increment in dry weight was considered as the measure of granuloma formation. Based on several studies, a 40% reduction in granuloma formation is considered significant.

Thus, a dose of 3 mg./kg. is sufficient to cause a 40% reduction in granuloma formation in 50% of the test animals.

The adjuvant-induced arthritis test was also conducted in rats using Compound 4. This test requires one month (from 0 to day 31). In the first seventeen days (0–17), the disease is in a developing stage, while for the remainder of the month (18–31) the disease is fully developed. The results of this test, given in terms of percent reduction of swelling in the hind paw of the rat are shown in Table IX.

The method is essentially that of Newbould, Brit. J. Pharmacol. 21: 127, 1963. The test compounds were studied in the developing arthritic state and in the established arthritic state. Separate gorups of twelve rats were administered the compounds orally using methylcellulose as the vehicle. In the study on the developing disease, administration of the test compounds begins on day 1 and on day 2 each animal is injected with .05 ml./kg. of a 0.5% suspension of heat-killed *Mycobacterium tuberculosis* into the plantar surface of the left hind paw. Foot volumes were measured by a water displacement device on the day of administration of the Mycobacterium and again on days 3, 10 and 17. The test compounds were administered once daily. Body weights were recorded daily and the animals were examined for the spread of the inflammation and the degree of secondary lesions observed and scored as "mild, moderate, or severe." For study in the established disease, another group of rats are injected with the Mycobacterium and foot volumes are measured and after twenty days are again measured and administration of the test compounds begins and continues for eleven days. Foot volume measurements are repeated on day 27 and day 31. The extent of the spread of the inflammation and the degree of lesions are recorded daily as are the body weights. The effect of the test compounds is measured by the percentage reduction in left hind paw volumes as compared to the hind pawl volumes of the control groups.

TABLE IX.—ADJUVANT-INDUCED ARTHITIS TEST IN RATS

Percent reduction in swelling—hind paw

| | | Compound 4 | | |
|---|---|---|---|---|
| | Day | 25 mg./kg. | 50 mg./kg. | 100 mg./kg. |
| Developing disease | 3 | 43 | 50 | 59 |
| | 10 | 13 | 29 | 16 |
| | 17 | 42 | 38 | 26 |
| Developed disease | 20 | 23 | 5 | 8 |
| | 27 | 23 | 10 | 14 |
| | 31 | 25 | 12 | 25 |

Compound 4 was further studied for its analgesic and antipyretic effects.

Analgesic activity

Compound 4 was studied in rats using the method of Randall and Sellito (Arch. Int. Pharmacodyn, 111: 406, 1957). Male rats of the Long Evans strain were used in this study. The left hind paw was injected with 0.1 ml. of a 20% brewers yeast suspension. One hour later the drug was administered orally, via stomach tube. The pain threshold was measured three hours after drug administration by applying a steadily increasing pressure of 16 grams per second to the inflamed paw. The end point (pain threshold) was defined as the pressure necessary to cause the animal to struggle and/or vocalize. Compound 4 was administered at the following dose levels (ten animals per group): 50, 100, and 200 mg./kg.

Groups of ten rats receiving the vehicle served as controls. Phenylbutazone at a dose of 100 mg./kg. was studied in parallel with Compound 4. The significance of the data is based on the number of animals responding with a 100% increase in pain threshold. The results are summarized in Table X.

TABLE X.—THE ACTIVITY OF COMPOUND 4 AND PHENYLBUTAZONE IN THE RANDALL-SELLITO ASSAY

| | Dose, mg./kg. | Pain threshold including gms. of pressure .025% methylcellulose | Number of rats exhibiting a 100% rise in pain threshold. .025% methylcellulose |
|---|---|---|---|
| Compound 4 | 50 | 89 | 3/10 |
| | 100 | 98 | 2/10 |
| | 200 | 135 | 8/10 |
| Phenylbutazone | 100 | 159 | 10/10 |

Inspection of the table reveals that although Compound 4 has analgesic activity it is not as active as phenylbutazone.

Antipyretic activity

The antipyretic activity of Compound 4 was evaluated in rats. Groups of five rats each were made hyperthermic by the subcutaneous injection of 1 ml./100 grams of body weight of a 10% brewer's yeast suspension. A control group of five rats received the brewer's yeast and was dosed orally with methylcellulose (.025%). Compound 4 was administered at 100 and 200 mg./kg. orally and phenylbutazone was given at 100 mg./kg. and studied in a parallel assay. Temperatures were measured at the time of yeast injection and seventeen hours later the temperatures were again recorded and the degree of hyperthermia evaluated. Drugs were then administered and the temperatures were again taken one and one-half hours after drug administration. The degree of antipyresis was evaluated by using the number of animals out of five which exhibited a 1° fall in body temperature. Compound 4 at 100 and 200 mg./kg. did not produce a significant antipyresis.

The compounds of the present invention, either alone, or in the form of pharmaceutical composition may be administered to an animal subject in any of a number of forms and via any of several routes. Thus, the compounds or compositions thereof may be orally administered in the form of tablets, pills, capsules, or in the form of a suspension. The compounds may also be administered parenterally in the form of an injectable solution or suspension. The compounds or compositions thereof may also be administered topically, in the form of an ointment or rectally, in the form of a suppository.

When orally administering the compounds or compositions, use can be made of a tablet, pill or capsule consisting entirely of the desired compound, although ordinarily, a composition comprising an effective amount of the compound and varying amounts of one or more physiologically inert materials such as carriers, vehicles, binders and the like will be used. Additionally, the compounds may be orally administered in the form of a suspension thereof in a suitable vehicle such as a syrup.

When parenterally administering the compounds or compositions, use may be made of a parenteral solution or suspension of the compound in a suitable solvent or suspension medium.

The compounds of the present invention may also be administered rectally in the form of a suppository comprising an effective amount of the desired compound and a suitable vehicle such as petroleum jelly.

Finally, the compounds of the present invention may be applied topically in the form of an ointment, salve, cream of lotion comprising an effective amount of the desired compound and a suitable vehicle such as petroleum jelly, etc.

The following examples are specific formulations of compositions according to the invention.

EXAMPLE 20

Tablets may be prepared by the compression of a wet granulation containing the following:

Ingredients: In each
Compound No. 4 _____ mg__ 10
Polyvinylpyrrolidone _____ mg__ 6
Lactose _____ mg__ 25
Alcohol, 3A, 200 proof _____ ml__ 1
Stearic acid _____ mg__ 3
Talc _____ mg__ 4
Corn starch _____ mg__ 15

Dosage: 1 tablet 3 times a day.

EXAMPLE 21

A liquid suspension for oral administration may be prepared in the following formulation:

Ingredients: In each 5 cc.
Compound No. 4 _____ mg__ 10
Sodium carboxymethyl-cellulose _____ mg__ 5
Syrup USP q.s. to _____ cc__ 5

Dosage: 1 teaspoonful (5 cc.) every 3 to 4 hours.

EXAMPLE 22

Dry filled capsules (DFC) consisting of two sections of hard gelatin may be prepared from the following formulation:

Ingredients: In each
Compound No. 4 _____ mg__ 10
Lactose USP, q.s.

Dosage: 1 capsule three times a day.

EXAMPLE 23

An ointment for optical use may be prepared using the following formulation:

Ingredients: Gm. in each
Compound No. 4 _____ 5
Hydrophilic petrolatum USP q.s. _____ 100

Dosage: To be applied to inflammed skin areas as needed.

EXAMPLE 24

A parenteral suspension for intra-muscular administration may be prepared in the following formulation:

Ingredients:
Compound No. 4 _____ mg__ 10
Isotonic solution (0.85% saline) _____ cc__ 5
Surfactant (a 1% solution of polysorbate 80 USP) _____ cc__ 1

Having thus described our invention, what we desire to claim and protect by Letters Patent is:

1. A method of preventing and inhibiting the formation of granuloma tissue in an animal subject, said method comprising administering to an animal subject a therapeutically effective amount of one compound having the formula as hereinafter set forth:

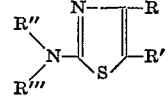

wherein R is lower alkyl, or N-aminocarbamoyl, R'' is hydrogen, lower alkyl or lower acyl, R''' is hydrogen, lower alkyl or lower acyl, and R' is —CONHR₁ or

wherein R₁ is phenyl, mono-, di-, or tri- (lower)-alkylphenyl, benzyl, halophenyl, cyclohexyl or amino, R₂ is lower alkl and R₃ is lower alkyl or phenyl or a pharmaceutically acceptable acid addition salt thereof.

2. A method as claimed in claim 1 wherein R is

or —CONHNH$_2$; R" is hydrogen, —C$_2$H$_5$ or —COCH$_3$; R''' is hydrogen, —C$_2$H$_5$ or —COCH$_3$; and R' is

—CONHR$_1$ in which R$_1$ is phenyl, o-tolyl, o-ethylphenyl, 2,6-dimethylphenyl, 2,6 - diethylphenyl, 2,4,6 - trimethylphenyl, benzyl, o-chlorophenyl, cyclohexyl or amino; or

—CONR$_2$R$_3$ in which R$_2$ is —CH$_3$, —C$_2$H$_5$ or —CH(CH$_3$)$_2$; R$_3$ is —C$_2$H$_5$, —CH(CH$_3$)$_2$ or —C$_6$H$_5$.

3. A method as claimed in claim 1 wherein R is —CH$_3$, R" and R''' are H and R' is

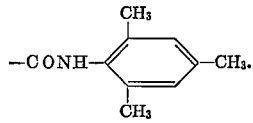

4. A method as claimed in claim 1 wherein said compound is administered to said animal in an orally administrable dosage form.

5. A method as claimed in claim 4 wherein said orally administrable dosage form is a pill, tablet or capsule.

6. A method as claimed in claim 4 wherein said orally administrable dosage form is a solution or suspension.

7. A method as claimed in claim 1 wherein said compound is administered to said animal in a parenterally administrable dosage form.

8. A method as claimed in claim 7 wherein said parenterally administrable dosage form is a solution or suspension.

9. A method as claimed in claim 1 wherein said compound is administered to said animal in a topical dosage form.

10. A method as claimed in claim 9 wherein said topical dosage form is an ointment.

11. A method as claimed in claim 1 wherein said therapeutically effective amount is from 0.1 to 100 mg./kg. of body weight of said animal per day.

12. A method as claimed in claim 11 wherein said amount is 10 to 25 mg./kg. of body weight per day.

13. A method as claimed in claim 1 wherein said therapeutically effective amount is from 0.1 to 1 mg./kg. of body weight of said animal per day.

14. A method as claimed in claim 13 wherein said amount is 0.25 to 0.6 mg./kg. of body weight per day.

15. A pharmaceutical preparation in dosage unit form adapted for administration to obtain an antiinflammatory effect comprising an antiinflammatory-effective nontoxic amount within the range from about 0.1 to about 100 mg./kg. of body weight of a compound having the formula as hereinafter set forth:

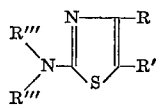

wherein R is lower alkyl, or N-aminocarbamoyl, R" is hydrogen, lower alkyl or lower acyl, R''' is hydrogen, lower alkyl or lower acyl, and R' —CONHR$_1$ or —CONR$_2$R$_3$, wherein R$_1$ is phenyl, mono-, di-, or tri-(lower)-alkylphenyl, benzyl, halophenyl, cyclohexyl or amino, R$_2$ is lower alkyl and R$_3$ is lower alkyl or phenyl or a pharmaceutically acceptable acid addition salt thereof; in combination with a physiogolically acceptable carrier and/or diluent therefor.

16. A composition as claimed in claim 15 wherein R is —CH$_3$, or —CONHNH$_2$; R" is hydrogen, —C$_2$H$_5$ or —COCH$_3$; R''' is hydrogen, —C$_2$H$_5$ or —COCH$_3$; and R' is —CONHR$_1$; in which R$_1$ is phenyl, o-tolyl, o-ethylphenyl, 2,6 - dimethylphenyl, 2,6 - diethylphenyl, 2,4,6 - trimethylphenyl, benzyl, o - chlorophenyl, cyclohexyl, or amino; or —CONR$_2$R$_3$; in which R$_2$ is —CH$_3$, —C$_2$H$_5$ or —CH(CH$_3$)$_2$; R$_3$ is —C$_2$H$_5$, —CH(CH$_3$)$_2$, or —C$_6$H$_5$.

17. A composition as claimed in claim 15 wherein R is —CH$_3$, R" and R''' are —H and R' is

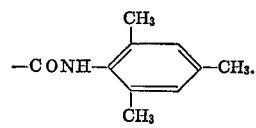

18. A composition as claimed in claim 15 in an orally administrable dosage form.

19. A composition as claimed in claim 18 wherein said orally administrable dosage form is a pill, tablet or capsule.

20. A composition as claimed in claim 19 wherein said pill, tablet or capsule comprises 10–15 mg. of said compound.

21. A composition as claimed in claim 18 wherein said orally administrable dosage form is a solution or suspension.

22. A composition as claimed in claim 21 wherein said solution or suspension comprises about 2 mg. of said compound per cc.

23. A composition as claimed in claim 15 in a parenterally administrable dosage form.

24. A composition as claimed in claim 23 wherein said parenterally administrable dosage form is a suspension.

25. A composition as claimed in claim 24 wherein said suspension comprises about 1.66 mg. of said compound per cc.

26. A composition as claimed in claim 15 in a topically administrable dosage form.

27. A composition as claimed in claim 26 wherein said topically administrable dosage form is an ointment.

28. A composition as claimed in claim 27 wherein said ointment comprises about 5 gm. of said compound per 100 gm. of total ointment.

References Cited
UNITED STATES PATENTS

| | | | |
|---|---|---|---|
| 3,505,055 | 4/1970 | Von Schmebig et al. | 71—90 |
| 3,547,917 | 12/1970 | Kulva et al. | 71—90 |
| 3,674,871 | 4/1972 | Evans | 424—20 |

STANLEY L. FRIEDMAN, Primary Examiner

U.S. Cl. X.R.

424—248

UNITED STATES PATENT OFFICE
CERTIFICATE OF CORRECTION

Patent No. 3,796,800          Dated March 12, 1974

Inventor(s) Zaven S. Ariyan, Marshall Kulka and William A. Harrison

It is certified that error appears in the above-identified patent and that said Letters Patent are hereby corrected as shown below:

Title, change "TRIAZOLE" to --THIAZOLE--.

Column 1, line 43: change "thiazol" to --thiazole--.

Column 7, structural formula above TABLE III,
" " should be -- --.

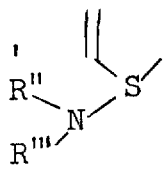   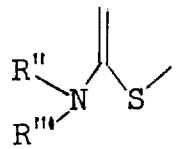

Column 13, lines 54-57: " " should be -- --. 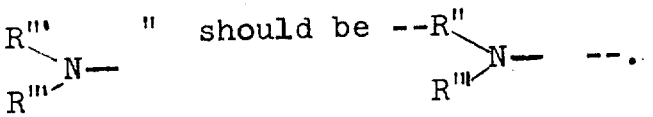

Column 14, line 53: change "Von Schmebig" to --von Schmeling--
line 54: change "Kulva" to --Kulka--.

Signed and sealed this 23rd day of July 1974.

(SEAL)
Attest:

McCOY M. GIBSON, JR.
Attesting Officer

C. MARSHALL DANN
Commissioner of Patents

UNITED STATES PATENT OFFICE
CERTIFICATE OF CORRECTION

Patent No. 3,796,800　　　　　　　　　Dated March 12, 1974

Inventor(s)　Zaven S. Ariyan et al.

It is certified that error appears in the above-identified patent and that said Letters Patent are hereby corrected as shown below:

Column 14, line 4, "physiogolically" should read -- physiologically --; line 28, "15" should read -- 50 --.

Signed and sealed this 22nd day of October 1974.

(SEAL)
Attest:

McCOY M. GIBSON JR.　　　　　　　　　　C. MARSHALL DANN
Attesting Officer　　　　　　　　　　　　Commissioner of Patents